(12) United States Patent
Mussmann

(10) Patent No.: US 8,926,023 B2
(45) Date of Patent: Jan. 6, 2015

(54) PROTECTIVE COVERING FOR A SEAT ADJUSTING MECHANISM

(75) Inventor: Christian Mussmann, Sankt Augustin (DE)

(73) Assignee: Johnson Controls Technology Company, Holland, MI (US)

( * ) Notice: Subject to any disclaimer, the term of this patent is extended or adjusted under 35 U.S.C. 154(b) by 58 days.

(21) Appl. No.: 13/575,077

(22) PCT Filed: Feb. 1, 2011

(86) PCT No.: PCT/EP2011/000440
§ 371 (c)(1),
(2), (4) Date: Sep. 21, 2012

(87) PCT Pub. No.: WO2011/107192
PCT Pub. Date: Sep. 9, 2011

(65) Prior Publication Data
US 2013/0009437 A1      Jan. 10, 2013

(30) Foreign Application Priority Data

Feb. 4, 2010    (DE) .......................... 10 2010 006 933

(51) Int. Cl.
*A47B 97/00*    (2006.01)
*A47C 31/00*    (2006.01)
*B60N 2/20*     (2006.01)
*B60N 2/22*     (2006.01)

(52) U.S. Cl.
CPC ... *B60N 2/20* (2013.01); *B60N 2/22* (2013.01)
USPC ................. 297/463.1; 297/452.38; 297/463.2

(58) Field of Classification Search
CPC .......... B60N 2/22; B60N 2/2356; B60N 2/10; B60N 2/20
USPC ............................................ 297/362, 367 R
See application file for complete search history.

(56) References Cited

U.S. PATENT DOCUMENTS

| | | | | |
|---|---|---|---|---|
| 4,252,372 A | * | 2/1981 | Harder, Jr. | 297/452.1 |
| 7,360,842 B2 | * | 4/2008 | Sayed et al. | 297/463.1 |
| 7,467,792 B2 | * | 12/2008 | Bittenbender et al. | 271/149 |
| 2009/0026825 A1 | * | 1/2009 | Ishijima et al. | 297/358 |

FOREIGN PATENT DOCUMENTS

| | | |
|---|---|---|
| DE | 1925778 A1 | 11/1970 |
| JP | 1178639 A | 3/1993 |
| JP | 11-115576 | 4/1999 |
| JP | 11-346859 | 12/1999 |
| JP | 2000102442 A | 4/2000 |
| JP | 2002-291560 | 10/2002 |
| JP | 2003-038281 | 2/2003 |

OTHER PUBLICATIONS

International Search Report for application No. PCT/EP2011/000440 mailed May 6, 2011.
International Preliminary Report on Patentability mailed Aug. 16, 2012.
Chinese Office Action dated May 13, 2014.
Japanese Office Action issue dated Dec. 17, 2013.

* cited by examiner

*Primary Examiner* — Chi Q Nguyen
(74) *Attorney, Agent, or Firm* — Fletcher Yoder, P.C.

(57) ABSTRACT

A vehicle seat having a backrest which is arranged on a seat part such that it can be pivoted and/or rotated by means of an adjusting mechanism, wherein the adjusting mechanism is covered with a covering and the covering is provided in two parts. The first part is made of a comparatively hard plastic material and the second part is made of a comparatively soft plastic material.

6 Claims, 4 Drawing Sheets

Figure 1:
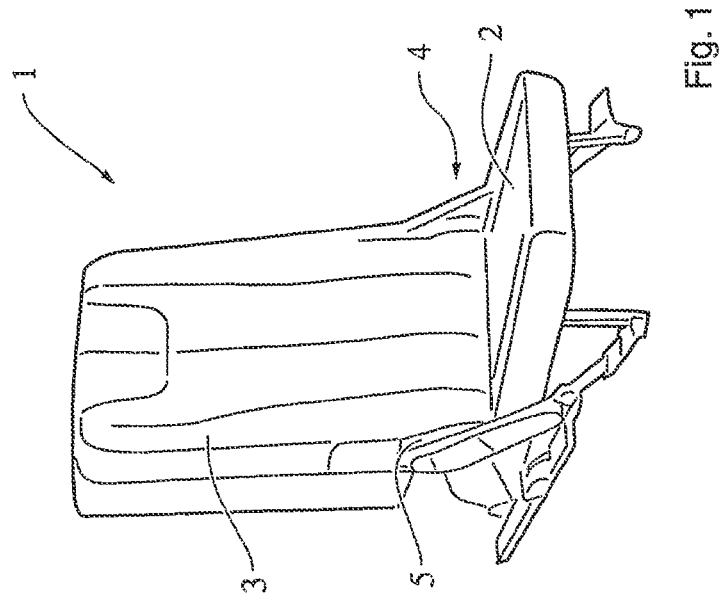

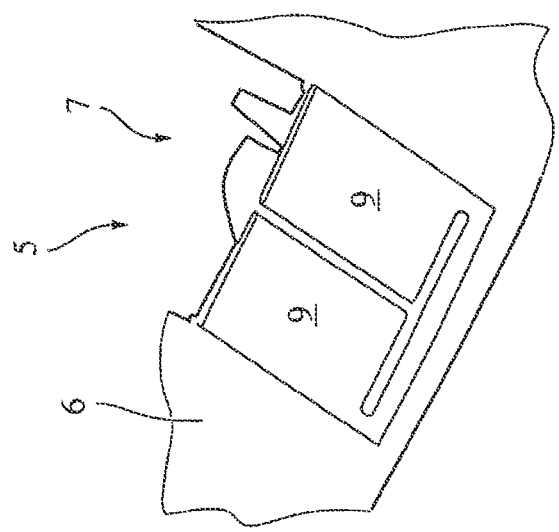
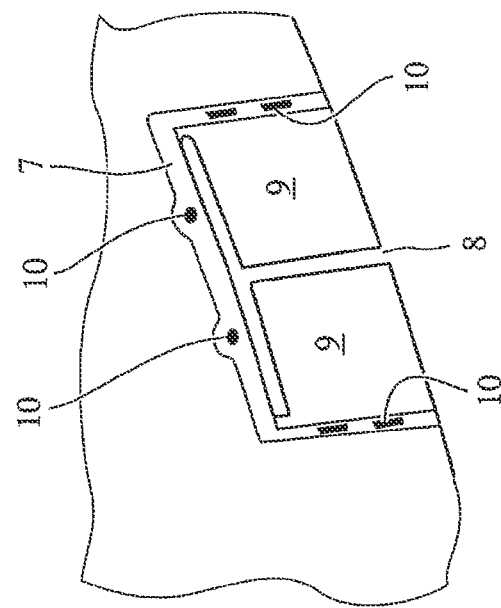
Fig. 4

PROTECTIVE COVERING FOR A SEAT ADJUSTING MECHANISM

CROSS REFERENCE TO RELATED APPLICATIONS

This application claims priority from and the benefit of PCT Application No. PCT/EP2011/000440, filed on Feb. 1, 2011 and German Patent DE 10 2010 006 933.7, filed on Feb. 4, 2010; both entitled "Protective Covering for a Seat Adjusting Mechanism", which are herein incorporated by reference.

BACKGROUND

The present invention relates to a vehicle seat with a backrest which is arranged on a seat part pivotably and/or rotatably by means of an adjusting mechanism.

Vehicle seats of this type are sufficiently known from the prior art and have a seat part and a backrest. The backrest is provided on the vehicle seat pivotably and/or rotatably by means of an adjusting mechanism. This adjusting mechanism often constitutes a risk of injury.

The object of the present invention was, therefore, to make available a vehicle seat which does not have the disadvantages of the prior art.

The object is achieved by means of a vehicle seat with a backrest which is arranged on a seat part pivotably and/or rotatably by means of an adjusting mechanism, this adjusting mechanism being covered by a covering, and the covering being provided in two parts, a first part being manufactured from comparatively hard plastic material and a second part being manufactured from comparatively soft plastic material.

SUMMARY

The present invention relates to a vehicle seat with a backrest which is arranged on a seat part pivotably and/or rotatably by means of an adjusting mechanism. These vehicle seats may accommodate one or more persons and be located in different seat rows, the vehicle seat of the invention in question here preferably being located in the third seat row. It is therefore especially preferably what is known as an emergency seat which is needed only when more persons have to be accommodated in the motor vehicle than there are seats available in the first two seat rows.

In the vehicle seat according to the invention, the backrest is pivotable and/or rotatable with respect to the seat part, for example for comfort adjustment, but particularly in order to bring the backrest from a position of use in which it is essentially perpendicular to the seat part into a stowage position in which it is parallel to the seat part. For this purpose, an adjusting mechanism is provided between the seat part and the backrest.

According to the invention, this adjusting mechanism is provided with a plastic covering. This covering is located, in particular, in a region which is arranged parallel to that bearing surface of the backrest against which the seat occupant's back bears and/or that bearing surface of the seat part against which the seat occupant's bottom bears. A curved covering is preferably provided.

According to the invention, the covering has two parts composed of different plastic materials, one part being manufactured from comparatively hard plastic material and one part being manufactured from comparatively soft plastic material.

Comparatively hard plastic material is dimensionally stable and can be deformed only by comparatively high forces being used. Comparatively hard plastic material has at 20° C. comparatively low elasticity, that is to say elastic deformability is relatively low. If comparatively high forces are used, comparatively hard plastic material is plastically deformed very quickly. Comparatively hard plastic material is, for example, a thermoplastic.

Comparatively soft plastic material is likewise dimensionally stable, but can be deformed elastically within very wide ranges, that is to say it assumes its original form as soon as the deformation force is no longer present. In particular, comparatively soft plastic material is more elastic than comparatively hard plastic material. However, it must be so hard that injury to the seat occupant is reliably avoided during normal operation. Comparatively soft plastic material is, for example, rubber or rubber-like material. Another example of soft material is foam-like plastic material.

Both parts preferably have comparatively low material thickness.

The covering is preferably composed for the most part of hard plastic material. Preferably, the part which is manufactured from comparatively hard plastic material has a recess in which preferably the part made from comparatively soft plastic is arranged.

These two parts may be connected to one another in a nonpositive, positive and/or materially integral manner.

Preferably, a slot, preferably a T-shaped slot, is provided in the part which is manufactured from comparatively soft plastic.

Preferably, the part which is manufactured from comparatively soft plastic has at least one, preferably two, tab(s). This tab can then be deformed reversibly, for example when the backrest is being adjusted.

Preferably, at least one rib, in particular one stiffening rib, is provided on the part which is manufactured from comparatively soft plastic.

Preferably, the part which is manufactured from comparatively soft plastic is provided, prestressed, in the part. In this preferred embodiment of the present invention, the part which is manufactured from comparatively soft plastic can be connected frictionally to the other part which is manufactured from comparatively hard plastic.

Preferably, the adjusting mechanism has a locking pin which, when the backrest is being adjusted, emerges from that part of the covering which is manufactured from comparatively hard plastic. In this case, the locking pin preferably deforms the tabs of the comparatively soft part reversibly.

DRAWINGS

The invention is explained below by means of FIGS. 1 to 4. These explanations are merely by way of example and do not restrict the general ideal of the invention.

Figure 2:
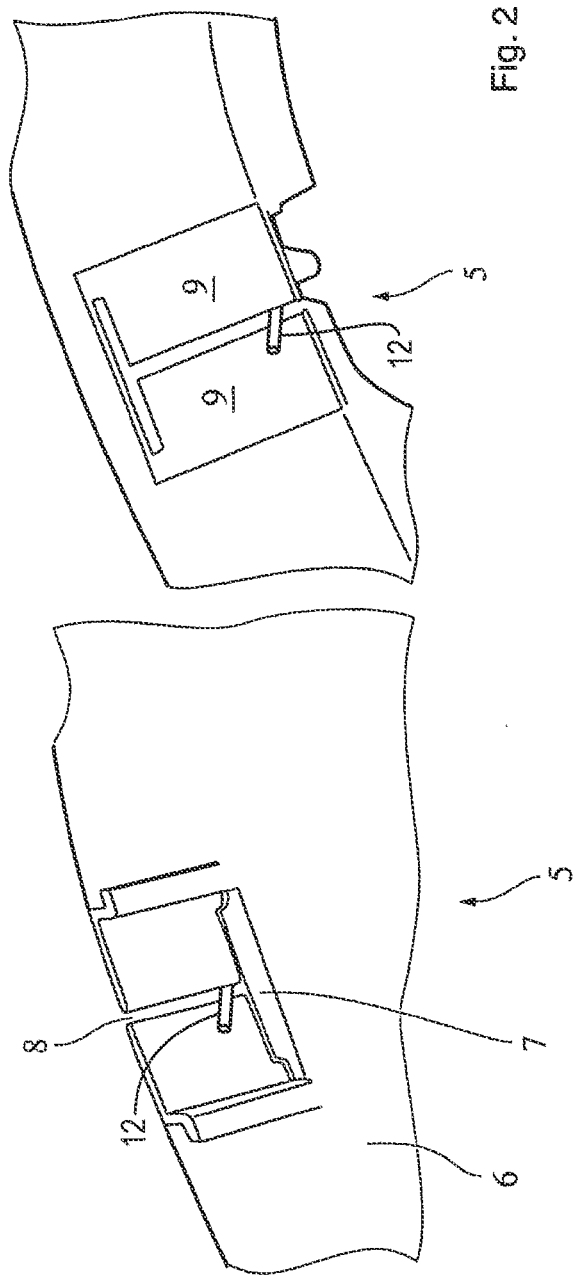
Figure 3:
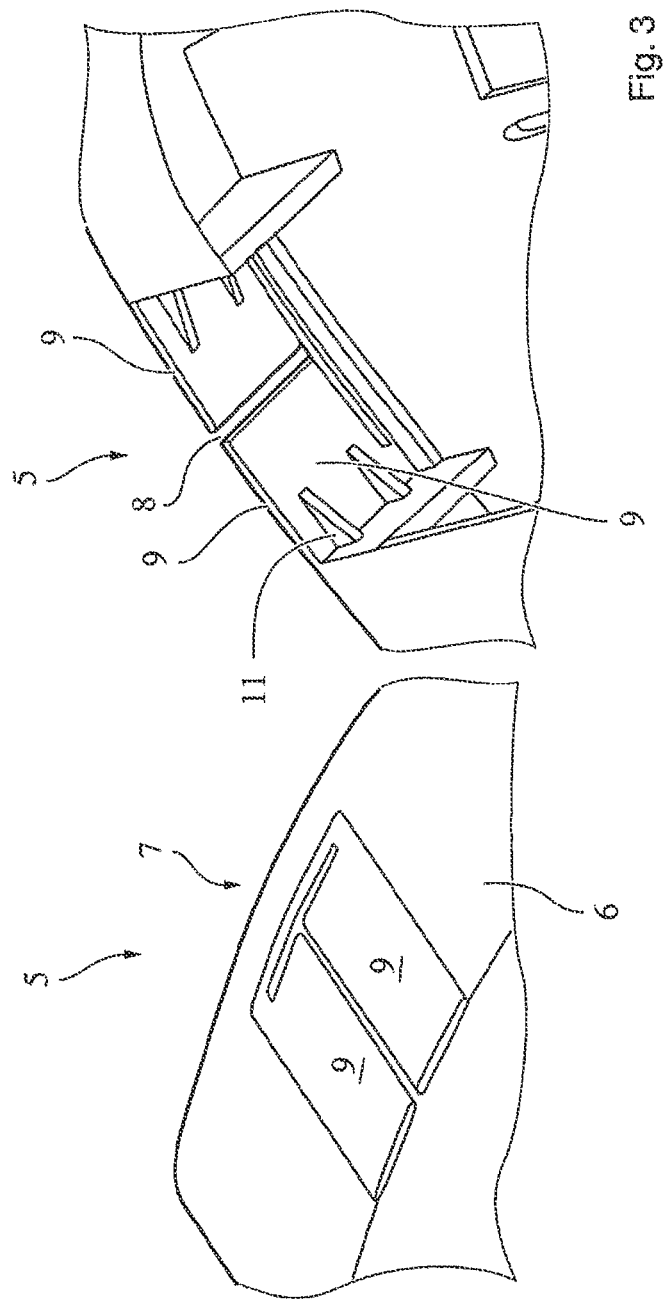

FIG. 1 shows the vehicle seat according to the invention,
FIG. 2 shows a first embodiment of the covering,
FIG. 3 shows a second embodiment of the covering, and
FIG. 4 shows a further embodiment of the covering.

DETAILED DESCRIPTION

FIG. 1 shows the vehicle seat 1 according to the invention which has a seat part 2 and a backrest 3. The backrest 3 can be brought by means of an adjusting mechanism 4, in particular, from the position of use illustrated into a stowage position in which the backrest is essentially parallel to the seat part. This adjusting mechanism 4 is provided with a covering 5 in order to prevent a person from being injured at the adjusting mechanism. Since, in the present case, the adjusting mechanism has a locking pin which has to move to and fro before, during and/or after the adjustment of the backrest, the covering has a recess, an aperture, through which the pin can emerge, as required, from the covering 5.

FIG. 2 shows a first embodiment of the covering 5. The covering 5 is composed essentially of a part 6 which is manufactured from comparatively hard plastic material. Arranged in the region of the aperture is a part 7 made from softer plastic material, in particular rubber-like plastic material, which is preferably connected to the plastic material of the part 6 in a materially integral manner. This materially integral connection is achieved, for example, by adhesive bonding and/or in that both plastic materials are used in a production process and are bonded with one another during curing. The part 7 preferably has a slot 8, in particular a T-shaped slot, thus resulting in two tabs 9 which assist the pin 12 in emerging from and penetrating through the covering. The tabs are in this case bend elastically.

FIG. 3 shows essentially the covering according to FIG. 2, in the present case the plastic part 7 having ribs 11 which stiffen the plastic part 7. In the present case, the connection between the plastic part 7 and plastic part 6 is made preferably frictionally, in particular, in that the part 7 is prestressed against the part 6. Prestress is assisted by the ribs 11 which give the part 7 additional rigidity.

FIG. 4 shows a further embodiment of the covering. In the present case, the plastic part 7 is connected to the plastic part 6 by means of weld spots, that is to say in a materially integral manner. However, the connecting points 10 may also be formed positively, for example in that in the plastic part 7 are recesses through which, for example, studs 10 of the plastic part 6 are inserted. Reference is otherwise made to the statements relating to FIGS. 2 and 3.

The invention claimed is:

1. A vehicle seat with a backrest which is arranged on a seat part pivotably or rotatably via an adjusting mechanism, wherein the adjusting mechanism is covered by a covering, and the covering is provided in two parts, a first part being manufactured from comparatively hard plastic material and a second part being manufactured from comparatively soft plastic material, wherein the second part is connected via a curing process to the first part to establish a materially integral bond, and at least one rib is provided on the second part.

2. The vehicle seat as claimed in claim 1, wherein a slot is provided in the second part.

3. The vehicle seat as claimed in claim 2, wherein the slot comprises a T-slot.

4. The vehicle seat as claimed in claim 1, wherein the second part has at least one tab.

5. The vehicle seat as claimed in claim 1, wherein the adjusting mechanism has a locking pin which emerges from the second part of the covering when the backrest is being adjusted.

6. The vehicle seat as claimed in claim 1, wherein the second part has two tabs.

* * * * *